(12) United States Patent
Moellendorf et al.

(10) Patent No.: US 6,174,746 B1
(45) Date of Patent: Jan. 16, 2001

(54) METHOD OF PRODUCING OPTICAL WAVEGUIDES

(75) Inventors: Manfred Moellendorf, Leonberg; Franz Laermer; Wilhelm Frey, both of Stuttgart, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/209,941

(22) Filed: Dec. 11, 1998

(30) Foreign Application Priority Data

Dec. 12, 1997 (DE) .................................. 197 55 416

(51) Int. Cl.⁷ ...................................... H01L 21/00
(52) U.S. Cl. .................................. 438/31; 438/31
(58) Field of Search ................ 438/31, 32, 22, 438/960, 978, 455, 23

(56) References Cited

U.S. PATENT DOCUMENTS

| | | | |
|---|---|---|---|
| 5,338,416 | 8/1994 | Mlcak et al. | 204/129.3 |
| 5,421,958 * | 6/1995 | Fathauer et al. | 216/48 |
| 5,736,749 * | 4/1998 | Xie | 257/3 |
| 5,811,348 * | 9/1998 | Matsushita et al. | 438/455 |

* cited by examiner

Primary Examiner—David Nelms
Assistant Examiner—Dung A Le
(74) Attorney, Agent, or Firm—Kenyon & Kenyon

(57) ABSTRACT

A method of producing an optical waveguide, in which a substrate of silicon is etched porously to a defined depth by anodic oxidation in an electrolyte containing hydrofluoric acid. The etched substrate is doped in a suitable dopant liquid containing cations. The doped layer of porous silicon is stabilized at an elevated temperature, and the stabilized layer is oxidized with a further increase in temperature. The oxidized porous layer is made to collapse at a temperature sufficient for partial melting. The surface of the collapsed silicon dioxide layer is covered in a pattern by a lithographic technique, and the cations are replaced by silver ions in the uncovered areas of the surface by bringing the surface in contact with a solution containing silver ions or silver complex ions.

5 Claims, 1 Drawing Sheet

METHOD OF PRODUCING OPTICAL WAVEGUIDES

FIELD OF THE INVENTION

The present invention relates to a method of producing optical waveguides on inorganic substrates.

BACKGROUND INFORMATION

It is known that optical waveguides can be produced on glass plates made of sodium silicate glass, with $Na^+$ ions in the glass being replaced by $Ag^+$ ions from a silver bath. The areas of the substrate where the exchange is to take place are usually defined by patterned covering of the surface areas of the substrate not intended for exchange by photoresist masks or copy resist masks in patterns obtained by exposing and washing or developing the photoresist layer. After treatment in a silver bath, which only has access to the exposed surface areas of the substrate, the refractive index in these areas is increased in comparison with the surrounding glass. This yields an optical waveguide, with the evanescent wave being located completely in the thick substrate glass. It would be desirable in principle to produce optical waveguides in silicon dioxide layers instead of glass, because this would offer the possibility of combining them with semiconductor elements. However, this is made difficult by the fact that thick silicon dioxide layers cannot be produced in an adequate optical quality; a high-grade thermally produced oxide can be manufactured industrially only up to a thickness of a few $\mu$m. This would not be sufficient for the evanescent light field. Furthermore, the oxide cannot be doped completely homogeneously with sodium ions, which would be necessary for an exchange reaction.

SUMMARY OF THE INVENTION

According to the present invention, a method is provided for producing an optical waveguide, with a substrate containing silicon being etched porously to a defined depth by anodic oxidation in an electrolyte containing hydrofluoric acid. The etched substrate is doped in a suitable dopant liquid containing cations, and the doped layer of porous silicon is oxidized to silicon dioxide at a temperature in the range of 600 to 900° C. The oxidized porous layer is made to collapse at a temperature in the range of approximately 1050° C. to 1150° C., with the surface of the collapsed silicon dioxide layer being covered in a pattern by the lithographic technique. The cations are replaced by silver ions in the uncovered areas of the surface by bringing the surface in contact with a solution containing silver ions or silver complex ions.

The method according to the present invention also makes it possible to produce thick (e.g., more than 5 $\mu$m) homogeneously doped oxide layers on silicon substrates, in particular silicon wafers, with excellent electrical and optical properties, with an optical waveguide optionally being integrated subsequently. An optical waveguide can be manufactured very inexpensively by this especially simple procedure, requiring only one mask plane. All the steps are available in semiconductor manufacturing, so it is possible to integrate optical waveguides into semiconductors as standard procedure.

Alkali metal ions such as sodium or lithium ions are thus preferably used as dopant cations. The dopant liquids are preferably aqueous solutions, generally containing the cations as salts, optionally also as hydroxides. Examples of suitable salts include carbonates, bicarbonates and halides, e.g., fluorides or chlorides, or acetates.

A suitable agent such as ethanol may be added to the dopant liquid to reduce surface tension. This improves homogeneous penetration of the entire porous area.

Due to anodic oxidation in an electrolyte containing hydrofluoric acid, in particular an aqueous electrolyte, the substrate is porously etched to a desired depth. This anodic etching is known per se and is described, for example, in U.S. Pat. No. 5,338,416 or the article "Porous Silicon Morphologies and Formation Mechanism" by Smith et al. in Sensors and Actuators (Elsevier Sequoia), A21–A23 (1990), pages 825–829. The porous material has an extremely enlarged surface area in comparison with the starting material (e.g., by a factor on the order of $10^6$ in the case of nanoporous silicon). This greatly increases the chemical reactivity and diffusion rate in the material. Then if the substrate is immersed in a suitable dopant liquid, the dopant atoms become incorporated into the silicon. Because of the sponge structure of the porous material with web widths in the range of a few nanometers, the porous layer is completely doped throughout.

The doped layer of porous silicon is then stabilized at relatively low temperatures in the range of 250 to 500° C., preferably about 300° C., and thermally oxidized at a temperature in the range of approximately 600 to 900° C., e.g. at about 800° C. Because of the high reactivity of porous silicon in comparison with the solid material, oxidation takes place relatively rapidly, i.e., within a few minutes to a few hours, depending on porosity, generally within about two hours. Then the resulting porous silicon layer is made to collapse within a short period of time, i.e., from about ten minutes to four hours, within about one hour in many cases, by heating to approximately 1050° C. to 1150° C., e.g., to about 1100° C. The oxide melts, forming a compact oxide layer at least 5 $\mu$m thick with electrical and optical properties comparable to those of thermally produced solid silicon dioxide.

The desired optical waveguide is then produced by the lithographic or photoresist technique. The surface is covered with a suitable resist layer and processed, e.g., by photolithographic techniques by patterned exposure and washing, to form an image mask which is then brought in contact with a solution containing silver ions or silver complex ions, e.g., a silver nitrate solution, an ammoniacal solution of silver chloride or a dicyanoargentate solution. Alkali ions in the oxide layer are replaced by silver ions in the surface areas not covered by the resist mask.

In addition to metallic silicon, other porous semiconductor materials such as silicon carbide may also be used as substrates and processed as described above.

DETAILED DESCRIPTION

Figure 1:
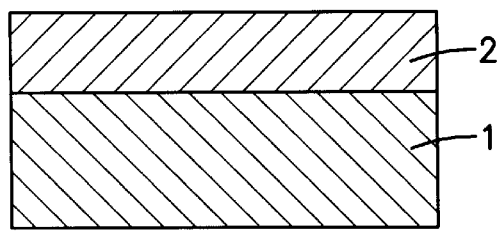
FIG. 1 shows a first step of a process according to the present invention for producing an optical waveguide.

FIG. 1 shows a substrate made of compact silicon (bulk silicon) 1 with a layer 2 of porous silicon (PorSi) produced on the substrate by anodizing.

Figure 2:
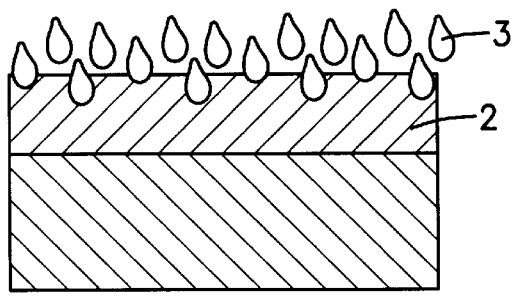
FIG. 2 shows a second step of the process according to the present invention for producing an optical waveguide.

FIG. 2 shows a doping step with porous layer 2 being brought in contact with a dopant liquid 3.

Figure 3:
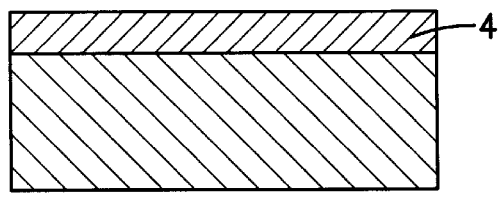
FIG. 3 shows a third step of the process according to the present invention for producing an optical waveguide.

FIG. 3 shows the substrate with compact oxide layer 4 obtained after stabilization, oxidation, and collapse.

Figure 4:
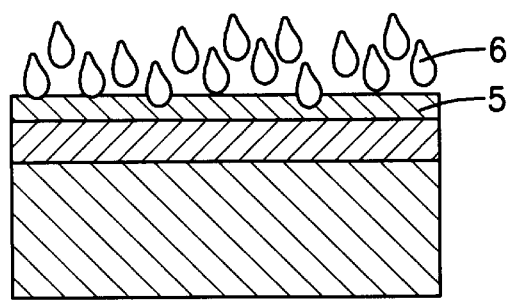
FIG. 4 shows a fourth step of the process according to the present invention for producing an optical waveguide.

FIG. 4 shows how the substrate with a doped oxide layer 4 covered in a pattern with a resist mask 5 is treated with a solution 6 containing silver ions to exchange dopant ions with silver ions.

Figure 5:
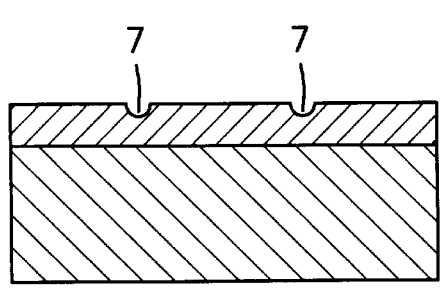
FIG. 5 shows a fifth step of the process according to the present invention for producing an optical waveguide.

Finally, FIG. 5 shows the finished optical waveguide with lines 7 which have different refractive index values and contain silver ions incorporated into the oxide layer.

What is claimed is:

1. A method of producing an optical waveguide, comprising the steps of:

porously etching a substrate containing silicon by performing an anodic oxidation procedure in an electrolyte containing hydrofluoric acid in order to produce a layer of porous silicon having a predetermined depth;

doping the etched substrate in a dopant liquid containing cations;

oxidizing the layer of porous silicon to silicon dioxide at a temperature in a range of approximately 600° C. to 900° C.;

causing the oxidized layer of porous silicon to collapse at a temperature in a range of approximately 1050° C. to 1150° C.;

covering a surface of the collapsed layer of porous silicon in a pattern using a lithographic technique; and replacing the cations with silver ions in uncovered areas of the surface of the layer of porous silicon by bringing the surface in contact with a solution containing one of silver ions and silver complex ions.

2. The method according to claim 1, wherein the cations include alkali metal ions.

3. The method according to claim 2, wherein the alkali metal ions include one of sodium ions and lithium ions.

4. The method according to claim 1, further comprising the step of adding a material for reducing surface tension to the dopant liquid.

5. The method according to claim 1, wherein the anodic oxidation procedure is performed such that the layer of porous silicon has a thickness of more than 5 $\mu$m.

* * * * *